Nov. 29, 1949  W. BROWN  2,489,517
MAGNETO-ELECTRIC MACHINE
Filed Nov. 27, 1946
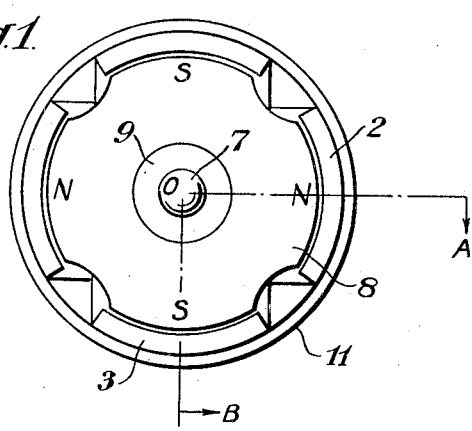
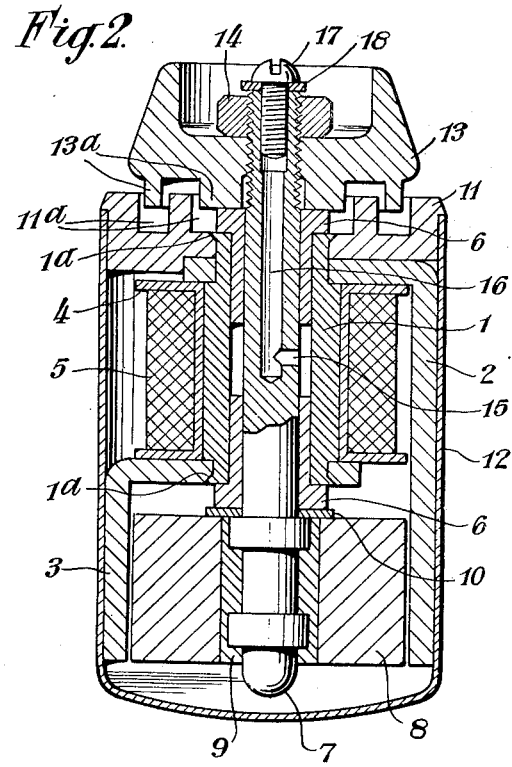
William Brown
INVENTOR
by [signature]
ATT'Y Patented Nov. 29, 1949

2,489,517

UNITED STATES PATENT OFFICE 2,489,517

MAGNETOELECTRIC MACHINES

William Brown, Nottingham, England

Application November 27, 1946, Serial No. 712,577
In Great Britain December 4, 1945

4 Claims. (Cl. 171—209)

1

This invention relates to magneto-electric machines of the type comprising rotor and stator elements, both of which elements may be wound, or one wound and the other a permanent magnet and at least one of which elements is of the imbricated type. The machine may be a generator in which case the rotor is driven and electric current drawn from the windings, or the machine may be a motor in which case electric current is supplied to the windings causing the rotor to rotate. An example of the first case is a small generator for supplying light on a bicycle, the generator being mounted on the cycle frame and being driven from the road-wheel, while an example of the second could be a synchronous motor for operating an electric clock.

The expression "imbricated type" is used herein to define a magnetic element having a plurality of interdigitated pole pieces of alternate polarity extending and energised from opposite ends of a common core.

Hitherto such machines have had the stator mounted in a casing; or end plates have been attached to the stator so as to form a casing, such casing or end plates being utilised to form the bearing housing for the rotor spindle. Alternatively, brackets have been attached to the stator for the same purpose. This type of construction introduces manufacturing difficulties including errors of concentricity of the stator and rotor. As is well known, the air gap between the stator and rotor should always be as small as possible in production; such gap must be larger than the tolerances for manufacturing errors of concentricity and is therefore generally made larger than is desirable. Further, since the rotor bearings of such machines as hitherto constructed lie outside of the stator, this increases the overall size of the machine.

One object of this invention is to simplify the construction and manufacture of machines of the type described. A further object is to reduce manufacturing errors of concentricity of rotor and stator.

A still further object of the invention is to reduce the size and weight of such machines for a specific output.

According to the invention a magneto-electric machine of the type referred to is characterised in that the pole pieces of the imbricated element from both ends of the common core overhang at the same end of the said core whereby, except for such pole pieces, the rotor and stator elements may be in axial juxtaposition. The improved machine may be further characterised in

2 that the said common core is constructed to provide relative concentricity location between the stator and rotor and possibly even to house within its length a bearing for the rotor.

A magneto-electric machine constructed according to one embodiment of this invention comprises in combination an imbricated element (stator or rotor) having a central common core and interdigitated pole pieces extending from the ends of the core and a complementary element (rotor or stator) located magnetically within said pole pieces, characterised in that the said complementary element is mounted on a spindle which passes through the common core of the imbricated element and takes its location therefrom, the imbricated poles being displaced laterally so as to overhang at one end of the common core and form the tunnel for the said complementary element.

In the accompanying drawing:

Fig. 1 is an end elevation of a four-pole tyre driven cycle generator constructed according to one example of the aforesaid embodiment of the invention, the cover being removed to show the internal parts;

Fig. 2 shows a two-plane axial section of the same generator, taken on line A—O—B of Fig. 1, the right hand half being taken in normal projection from Fig. 1.

Referring to the drawing this shows a generator comprising an imbricated four-pole stator consisting of a hollow common core-piece 1 carrying cup-shaped pole pieces 2 and 3 both of which overhang at the same end of the common core to form a tunnel for the rotor described later, said pole pieces having bases mounted on the ends of the stator core. The major portion of each pole piece constitutes part of an open-ended common cylindrical figure within which the remaining electrical parts of the stator and rotor, namely the windings and rotor, are located. On the common core is a bobbin 4 embracing the core 1 and carrying the windings 5. Bushes 6 are fitted to the hollow core-piece 1, these bushes forming the bearings for a rotor spindle 7. The spindle 7 has attached to it a permanent magnet rotor 8 having four poles of alternate polarity marked N and S. The driving connection between the spindle 7 and magnet 8 is provided by means of the fusible alloy 9 in this case, but the said connection could be effected by riveting or screwing. A thrust washer 10 is fitted to present a smooth face to the bush 6. Included in the stator assembly is a cap 11 formed with a shoulder to locate the end of a thimble-like cover 12. The ends of the core 1 are riveted over at 1a against the pole piece 3 and cap 11 respectively as a means of securing both pole pieces and such cap to the core. A driving pulley 13 is screwed to the shaft 7 and locked in place by the nut 14. Ridges 13a are provided on the pulley 13 to co-act with grooves 11a in the end-cap 11 so as to form a labyrinth for the exclusion of dirt from the bearings.

Lubrication for the bearings is provided by means of the oilways 15 and 16, the open end being sealed by the screw 17 and washer 18.

As will easily be appreciated the improved construction above described simplifies the problem of ensuring concentricity of the stator and rotor because, after securing the pole pieces 2 and 3 to the common core 1 it is a simple matter to finish the bore of the rotor tunnel and of the core for concentricity. Similarly, the outer periphery of the rotor 8 can be finished concentrically with the bearing surface of its spindle 7 so that, when the bushes 6 have been fitted, manufacturing errors of concentricity of rotor and stator are reduced to a minimum. Also, the construction provides a relatively long bearing for the rotor and as a consequence, the machine can be produced to close limits or tolerances and with a very small air gap. As such bearing is within the length of the stator, a relatively long bearing can be provided without increasing the overall length of the structure.

The improved construction, including the features of disposition of the rotor at the end of the stator enables the size and weight of the machine to be reduced compared with a machine of the same capacity produced by previously known methods of construction.

As regards the electrical function of the machine, it will be seen that with the parts in the position shown in Fig. 1, the magnet 8 will induce north polarity in the outer pole piece 2 and south polarity in the inner pole piece 3, the magnetic circuit being completed through the common core 1. Rotation of the magnet 8 through 90° will reverse this polarity, with consequent reversal of flux in the core which as well known will generate an electric current in the winding 5 which may be used to light an electric lamp connected in series with the said winding.

The improved construction enables the relative size and weight of the machine, for a specific output, to be substantially reduced.

In another example of the invention the rotor is fixed to the end of its spindle which is mounted in a bearing member formed with a spigot adapted to fit into and locate the ends of the pole pieces of the imbricated member. In this construction, since the spindle of the rotor does not pass through the common core, such common core and consequently the whole machine may be smaller in diameter whilst necessarily longer, but this alternative construction still embodies the feature of simplicity of construction and that for a specific output the size and weight of the machine may be substantially reduced compared with previously known construction.

The invention is not limited to all the details of construction shown. Modifications may be employed without departing from the nature of the invention, such as the use in the stator assembly of an axially magnetised permanent magnet as the common core and in place of the stator winding, such stator assembly being used in combination with a wound rotor. Alternatively, in the case of a motor, both the stator and rotor may be wound, suitable brush gear being incorporated to carry the current to the rotor. Obviously in all cases, the terms stator and rotor are interchangeable as is well known.

What I claim is:

1. A magneto-electric machine comprising a cylindrical stator core, stator windings on the outer face of said core, bushings having flanged ends fixed within said core at the opposite ends thereof and seating on the ends of said core, a rotor spindle mounted in said bushings and extending beyond the end of said core, a rotor magnet secured to said extending part of said spindle, a set of U-shaped stator pole pieces having the base mounted about one end of said core and the legs thereof extending parallel to said spindle into proximity with said rotor magnet, a second set of U-shaped stator pole pieces having the base mounted about the other end of said core and the legs extending parallel to said spindle into proximity with said rotor magnet, a cap mounted about said first end of said core, and a cover for said stator and pole pieces secured to said cap and contacting the adjacent pole pieces.

2. A magneto-electric machine comprising a cylindrical stator core, stator windings on the outer face of said core, bushings having flanged ends fixed within said core at the opposite ends thereof and seating on the ends of said core, a rotor spindle mounted in said bushings and extending beyond the end of said core, a rotor magnet secured to said extending part of said spindle, a set of U-shaped stator pole pieces having the base mounted about one end of said core and the legs thereof extending parallel to said spindle into proximity with said rotor magnet, a second set of U-shaped stator pole pieces having the base mounted about the other end of said core and the legs extending parallel to said spindle into proximity with said rotor magnet, a cap mounted about said first end of said core, and a cover for said stator and pole pieces secured to said cap and contacting the adjacent pole pieces, a driving pulley on said spindle adjacent to said cap and cooperating grooves on said pulley and cap to form a labyrinth, said pulley being substantially in contact with the flanged end of the adjacent bushing.

3. A magneto-electric machine comprising a cylindrical stator core, stator windings on the outer face of said core, bushings having flanged ends fixed within said core at the opposite ends thereof and seating on the ends of said core, a rotor spindle mounted in said bushings and extending beyond the end of said core, a rotor magnet secured to said extending part of said spindle, a thrust washer on said spindle interposed between said rotor magnet and the flanged end of the adjacent bushing, a set of U-shaped stator pole pieces having the base mounted about one end of said core and the legs thereof extending parallel to said spindle into proximity with said rotor magnet, a second set of U-shaped stator pole pieces having the base mounted about the other end of said core and the legs extending parallel to said spindle into proximity with said rotor magnet, a cap mounted about said first end of said core, and a cover for said stator and pole pieces secured to said cap and contacting the adjacent pole pieces.

4. A magneto-electric machine comprising a cylindrical stator core, stator windings on the outer face of said core, bushings having flanged ends fixed within said core at the opposite ends thereof and seating on the ends of said core, a rotor spindle mounted in said bushings and extending beyond the end of said core, a rotor magnet secured to said extending part of said spindle, a fusible alloy between said spindle and said rotor magnet and constituting said securing means, a set of U-shaped stator pole pieces having the base mounted about one end of said core and the legs thereof extending parallel to said spindle into proximity with said rotor magnet, a second set of U-shaped stator pole pieces having the base mounted about the other end of said core and the legs extending parallel to said spindle into proximity with said rotor magnet, a cap mounted about said first end of said core, and a cover for said stator and pole pieces secured to said cap and contacting the adjacent pole pieces.

WILLIAM BROWN.

REFERENCES CITED

The following references are of record in the file of this patent:

UNITED STATES PATENTS

| Number | Name | Date |
| --- | --- | --- |
| 1,966,897 | Lofgren | July 17, 1934 |
| 1,993,824 | Bohli | Mar. 12, 1935 |
| 2,128,719 | Thompson | Aug. 30, 1938 |
| 2,192,073 | Giskes | Feb. 27, 1940 |
| 2,213,724 | Vogel | Sept. 3, 1940 |
| 2,257,824 | Tognola | Oct. 7, 1941 |
| 2,334,976 | Winther | Nov. 23, 1943 |

FOREIGN PATENTS

| Number | Country | Date |
| --- | --- | --- |
| 436,145 | Great Britain | Oct. 7, 1935 |
| 507,663 | Germany | Sept. 20, 1930 |